United States Patent
Valentine et al.

(10) Patent No.: US 6,253,079 B1
(45) Date of Patent: Jun. 26, 2001

(54) SYSTEM AND METHOD FOR OPTIMIZATION OF CALLS BASED UPON AVAILABLE SATELLITE RESOURCES

(75) Inventors: Eric Valentine, Plano; Vladimir Alperovich, Dallas, both of TX (US)

(73) Assignee: Ericsson Inc., Reserach Triangle Park, NC (US)

( * ) Notice: Subject to any disclaimer, the term of this patent is extended or adjusted under 35 U.S.C. 154(b) by 0 days.

(21) Appl. No.: 09/213,519

(22) Filed: Dec. 17, 1998

(51) Int. Cl.[7] .................................................. H04Q 7/20
(52) U.S. Cl. .......................... 455/428; 455/12.1; 455/435
(58) Field of Search ............................. 455/428, 12.1, 455/13.1, 426, 432, 427, 430, 507, 508, 509, 435, 445, 524, 525

(56) References Cited

U.S. PATENT DOCUMENTS

| | | | |
|---|---|---|---|
| 5,073,900 | * 12/1991 | Mallinckrodt | 455/430 |
| 5,448,623 | * 9/1995 | Wiedeman | 455/13.1 |
| 5,832,382 | * 11/1998 | Alperovich | 455/433 |
| 5,862,478 | * 1/1999 | Cutler, Jr. et al. | 455/428 |
| 5,884,142 | * 3/1999 | Wiedeman et al. | 455/12.1 |
| 5,937,352 | * 8/1999 | Courtney et al. | 455/429 |
| 5,963,862 | * 10/1999 | Adiwoso et al. | 455/430 |
| 6,018,660 | * 1/2000 | Alperovich et al. | 455/427 |
| 6,064,882 | * 5/2000 | Coyne et al. | 455/428 |
| 6,067,453 | * 5/2000 | Adiwoso et al. | 455/430 |
| 6,138,014 | * 10/2000 | Alperovich et al. | 455/428 |

* cited by examiner

Primary Examiner—William Trost
Assistant Examiner—Tailhun Gesesse
(74) Attorney, Agent, or Firm—Jenkens & Gilchrist, P.C.

(57) ABSTRACT

A telecommunications system and method is disclosed for optimizing satellite resources to prevent overconsumption of the satellite resources of a first network operator by subscribers associated with a second network operator. During call optimization, an indication is included in a Location Update request sent by a Mobile Station (MS) to an optimal Mobile Switching Center/Visitor Location Register (MSC/VLR) that suggests to the optimal MSC/VLR that the reason for the Location Update is the equivalent of "satellite radio access registration." The optimal MSC/VLR examines this indication, and based on the amount of available satellite radio resources, either accepts the Location Update request or returns a rejection message indicating that radio access registrations are either permanently or temporarily not allowed.

31 Claims, 7 Drawing Sheets

SYSTEM AND METHOD FOR OPTIMIZATION OF CALLS BASED UPON AVAILABLE SATELLITE RESOURCES

BACKGROUND OF THE PRESENT INVENTION

1. Field of the Invention

The present invention relates generally to telecommunications systems and methods for monitoring satellite resources, and specifically to optimization of calls based upon the amount of available satellite resources.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
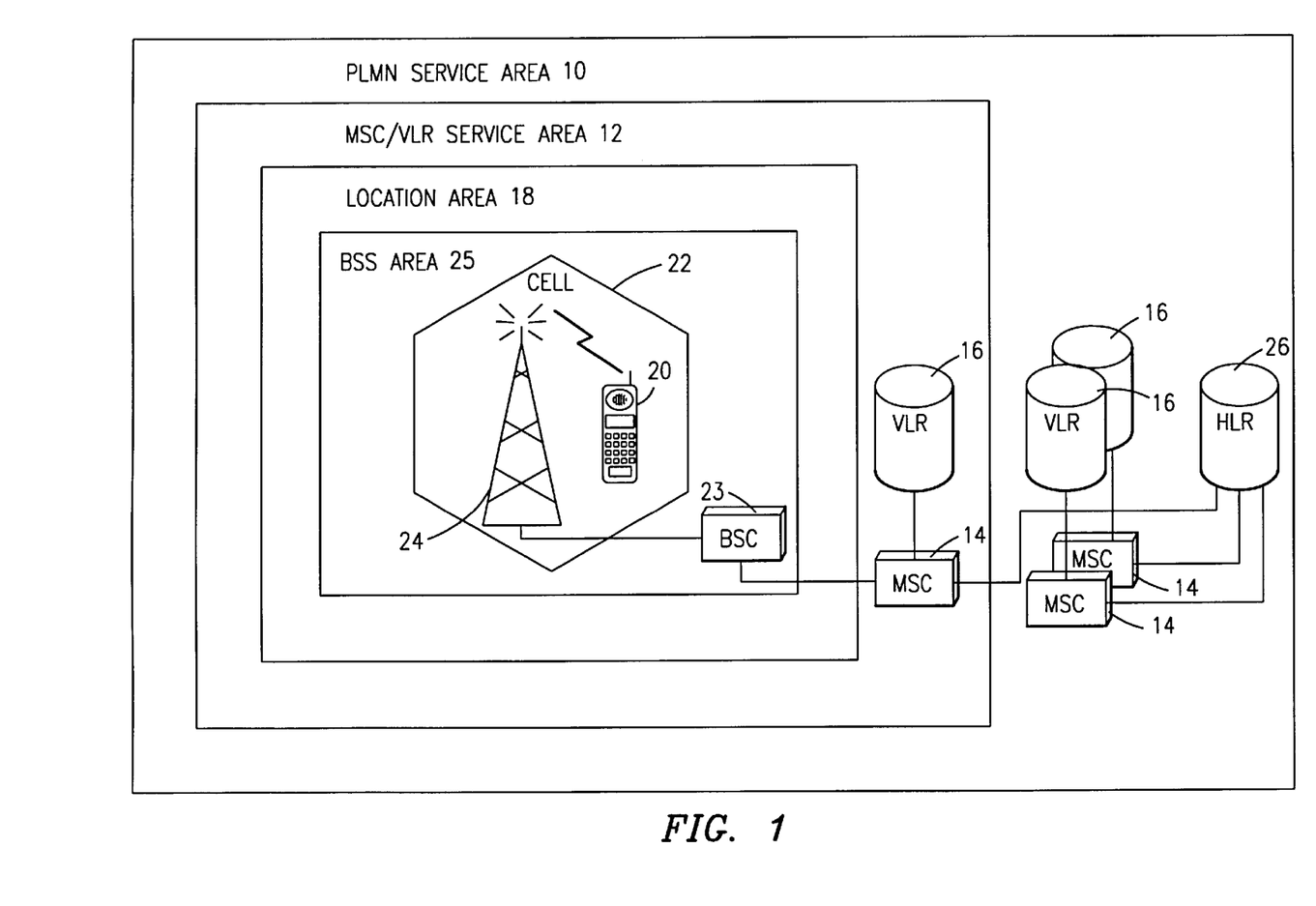
FIG. 1 is a block diagram of a conventional terrestrially-based wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Figure 2:
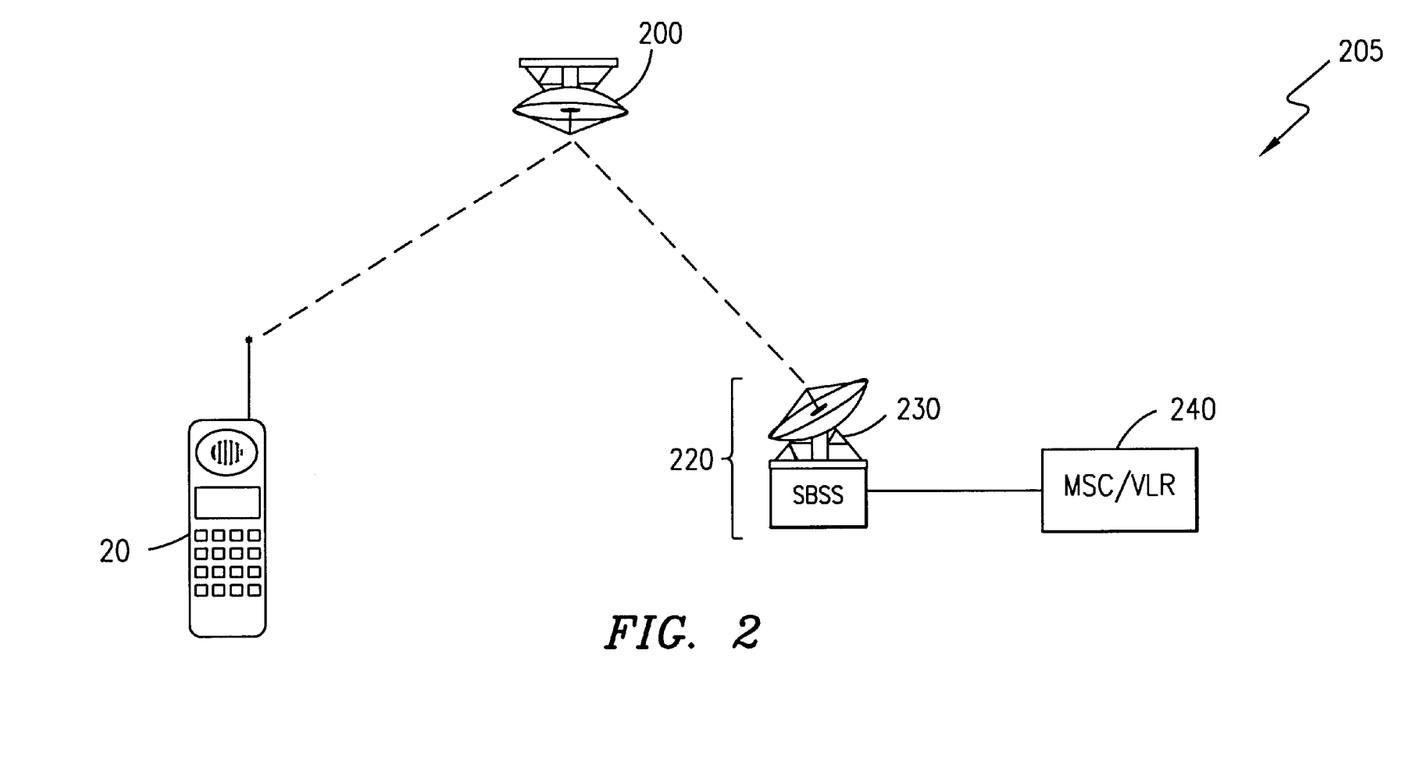
FIG. 2 is a block diagram illustrating aspects of a sample conventional satellite-based telecommunications system.

Within a satellite-based network 205, as shown in FIG. 2 of the drawings, a system of geostationary satellites 200 in orbit (one of which is shown) are used to provide communication between Mobile Stations (MS) 20 and a satellite-adapted Base Station System (SBSS) 220, which is connected to an integrated Mobile Switching Center/Visitor Location Register (MSC/VLR) 240. The MS 20 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the Mobile Stations 20. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Currently, the terrestrial trunk circuits are leased or owned by the operator, and in some cases, may need to be installed when the satellite network 205 is commissioned. Since the distances within the area served by the satellite(s) 200 are typically very large, the costs for these circuits can be enormous. In particular, the costs can be considerable if the circuits must cross remote areas or oceans.

Figure 3:
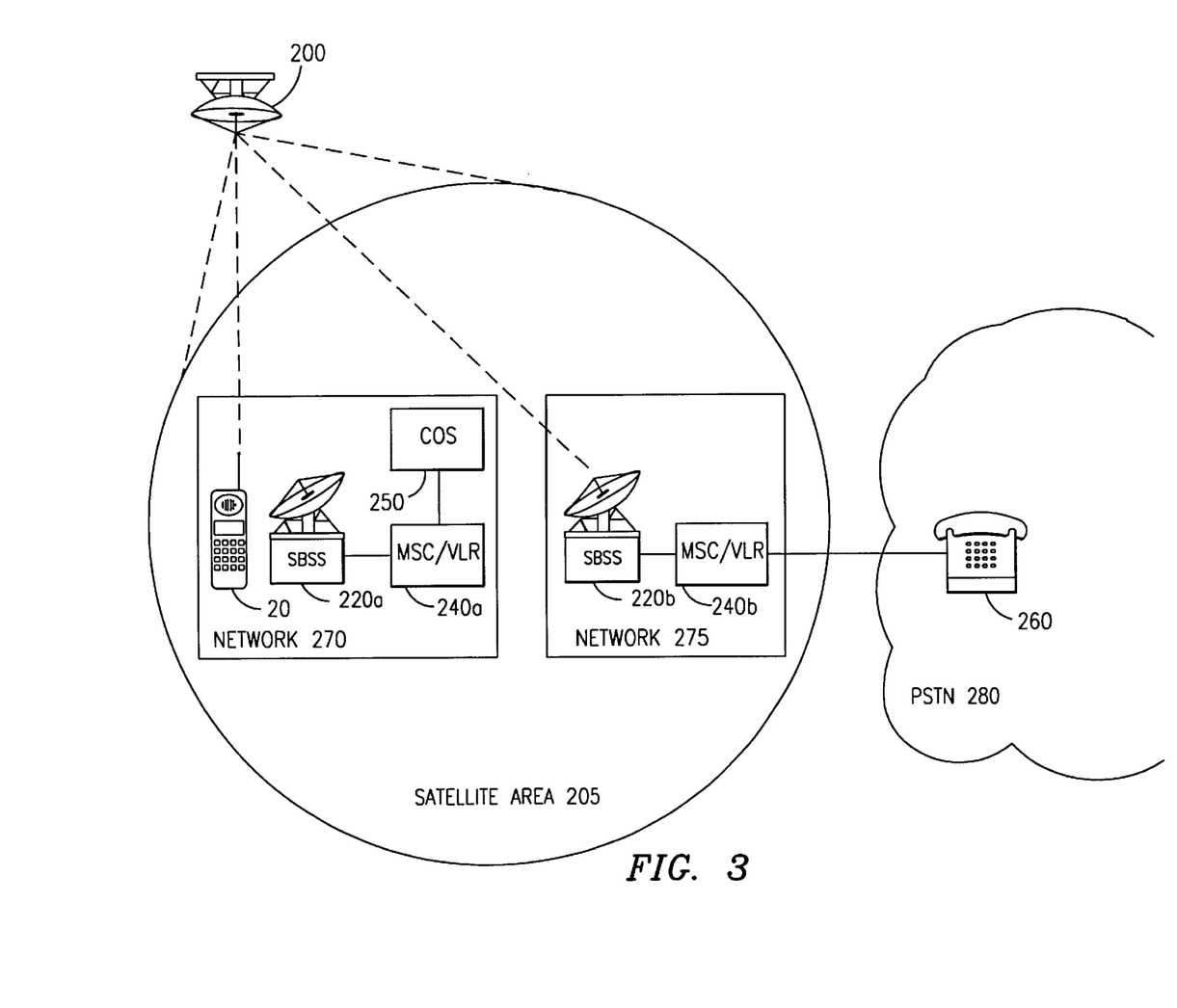
FIG. 3 illustrates the conventional optimization of a call using satellite resources.

Thus, as shown in FIG. 3 of the drawings, calls can be optimized using satellite resources by moving a mobile subscribers registration from a serving MSC/VLR 240a to an optimum MSC/VLR 240b. This can be accomplished by sending the Called Party Number (CPN) using, for example, an Unstructured Supplementary Services Data (USSD) string, to a Call Optimization Server (COS) 250 via the serving SBSS 220a and the serving MSC/VLR 240a. The COS 250 performs a pre-analysis on the CPN to determine the optimum MSC/VLR 240b, e.g., the MSC/VLR 240b with either the closest connection to the called subscriber 260 or the MSC/VLR 240b with the least expensive link to the called subscriber 260. Thereafter, the address of the optimum MSC/VLR 240b is returned to the MS 200 which can then register with the indicated MSC/VLR 240b. Once the registration is complete, the MS 200 can send a SETUP message to the new MSC/VLR 240b via the new SBSS 220b, and the call can be completed.

However, optimizing the use of terrestrial circuits by using a different satellite access for radio connectivity can create overconsumption problems for some network operators. Typically, when a call is optimized from the serving MSC/VLR 240a belonging to a first network operator 270 to the optimal MSC/VLR 240b with satellite radio access capabilities, that optimal MSC/VLR 240b belongs to another network operator 275. The satellite resources are generally apportioned to different operators 270 and 275 and different MSC/VLR's 240, with reserve satellite capacity left in a central "pool." If optimization requires a number of subscribers assigned to the first network operator 270 to be reassigned to an MSC/VLR 240b served by a second network operator 275, the reassigned subscribers could consume an excessive amount of satellite resources on the second network operator's 275 system, such that the subscriber's "belonging" to the second network operator 275 would not be able to access the system.

In addition, roaming agreements between network operators 270 and 275 typically provide for a wholesale, flat rate or free charge for serving subscribers associated with the other network operator 270 or 275. These charges are typically less than the charges the network operator's 270 and 275 own subscribers would pay. Therefore, when overconsumption by another network operator's 270 or 275 subscribers occurs, the result for the network operator 270 or 275 providing donor radio access is a loss of revenue and degraded service for their own subscribers.

It is, therefore, an object of the present invention to optimize satellite resources to prevent overconsumption of satellite resources of a first network operator by subscribers associated with a second network operator.

SUMMARY OF THE INVENTION

The present invention relates to telecommunications systems and methods for optimizing satellite resources to prevent overconsumption of the satellite resources of a first network operator by subscribers associated with a second network operator. During call optimization, an indication is included in a Location Update request sent by a Mobile Station (MS) to an optimal MSC/VLR that suggests to the optimal MSC/VLR that the reason for the Location Update is the equivalent of "satellite radio access registration." The optimal MSC/VLR examines this indication, and based on the amount of available satellite radio resources, either accepts the Location Update request or returns a rejection message indicating that radio access registrations are either permanently or temporarily not allowed. Preferably, a time period can be included with the rejection message that indicates the amount of time the requesting MS should wait before sending another such request. Advantageously, embodiments of the present invention prevent overconsumption of satellite resources of a first network operator by subscriber's associated with a second network operator. In addition, embodiments of the present invention allow for optimization of satellite calls to an optimal MSC/VLR when satellite resources are available.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 4:
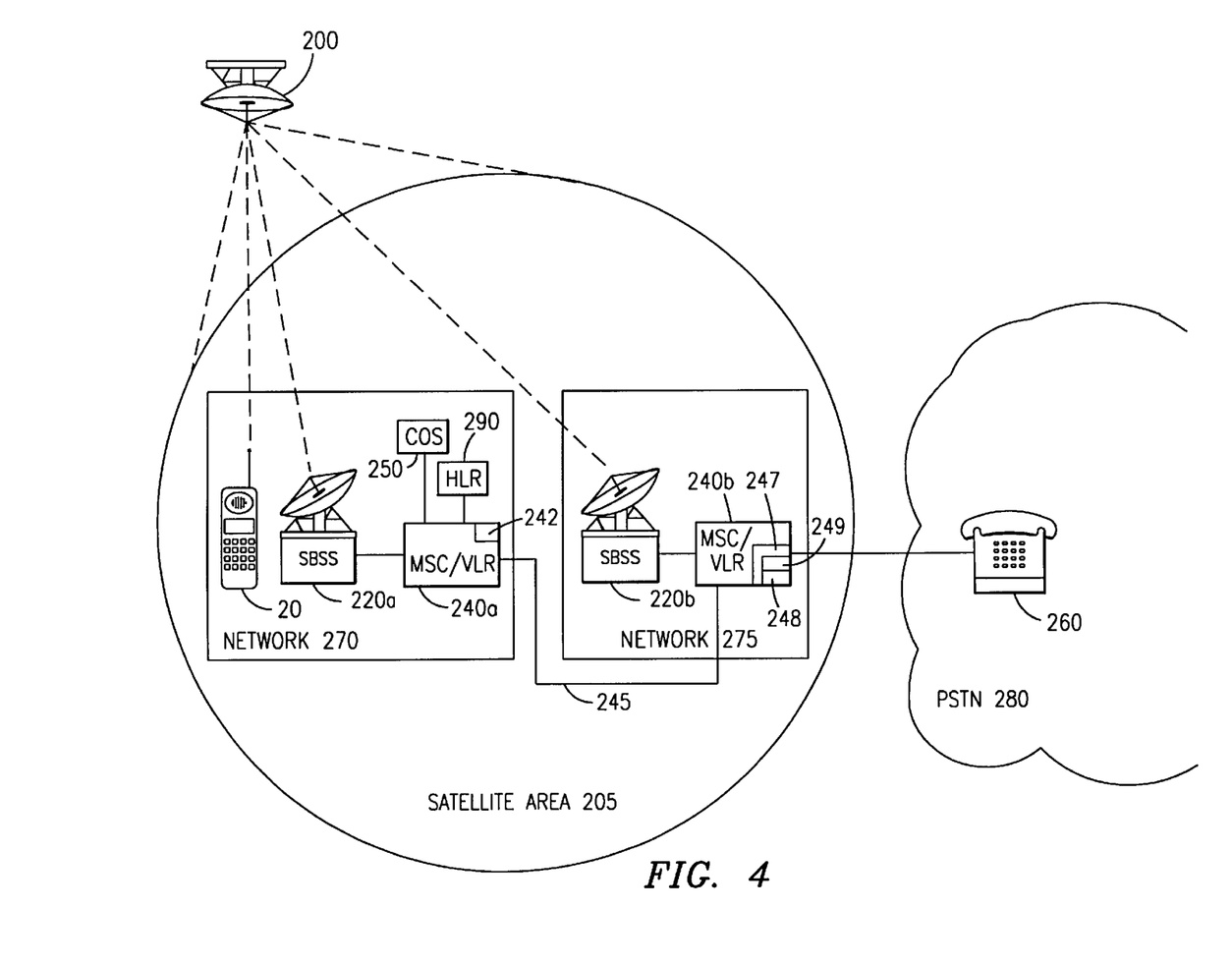
FIG. 4 illustrates the optimization of a call from a mobile station to a fixed subscriber based upon available satellite resources in accordance with embodiments of the present invention.
Figure 5:
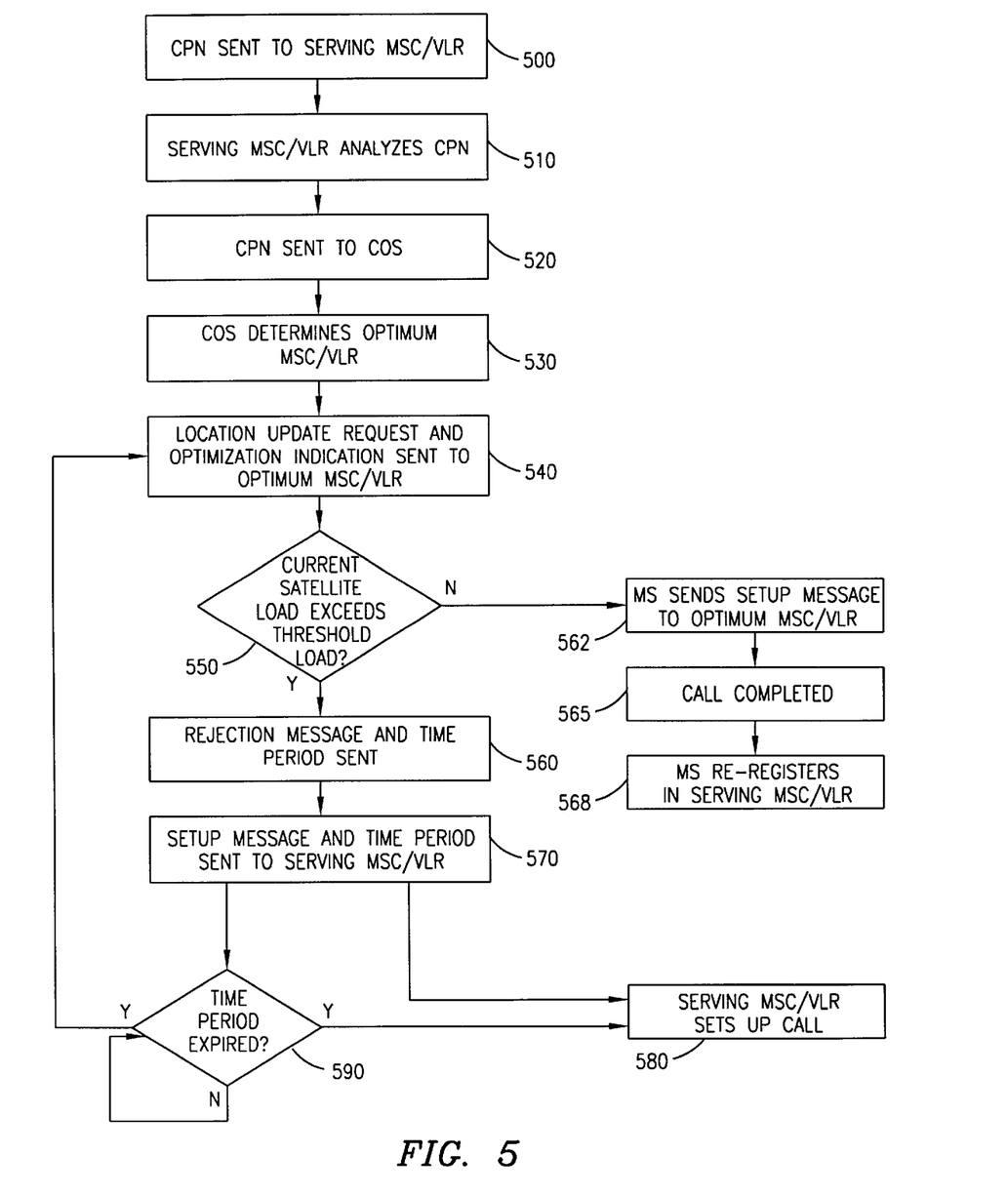
FIG. 5 shows steps in optimizing a call based upon available satellite resources as shown in FIG. 4 of the drawings.

With reference now to FIG. 4 of the drawings, which will be described in connection with the steps shown in FIG. 5 of the drawings, optimization of a call from a Mobile Station (MS) 20 to a called subscriber 260 within the Public Switched Telephone Network (PSTN) 280 (wireline network) can be accomplished by moving the calling MS's 20 registration to an optimum MSC/VLR 240b. The MS 20 initiates a call to the called subscriber 260 by inputting a Called Party Number (CPN) associated with the called subscriber 260 and transmitting the CPN in an ACCESS REQUEST message on the Random Access Channel (RACH) to a Mobile Switching Center/Visitor Location Register (MSC/VLR) 240a serving a first network operator 270 via a satellite 200 and a serving Satellite-Adapted Base Station System (SBSS) 220a.

The serving MSC/VLR 240a analyzes the CPN and determines that the CPN is not a number registered within the serving MSC/VLR 240a. Thereafter, the serving MSC/VLR 240a sends the CPN, using, for example, an Unstructured Supplementary Services Data (USSD) string, to a Call Optimization Server (COS) 250 or optimization node, which can be co-located with the serving MSC/VLR 240a. Alternatively, it should be noted that the COS 250 could instead be co-located with a Home Location Register (HLR) 290, within the SBSS 220a or within an external node (not shown), such as a node within the Intelligent Network. The protocol to the external node could be based on an Intelligent Network (IN), Mobile Application Part (MAP) or other protocol.

The COS 250 performs a pre-analysis on the CPN to determine the destination end office (not shown) of the CPN. Thereafter, the COS 250 determines the optimum MSC/VLR 240b, e.g., the MSC/VLR 240b within the area 205 visible to the satellite 200 that has the closest connection to the PSTN 280 or the least expensive link to the PSTN 280, and returns the address for this optimum MSC/VLR 240b to the MS 20 via the satellite 200, the serving MSC/VLR 240a and the serving SBSS 220a. The MS 20 attempts to register with the indicated optimum MSC/VLR 240b by sending a Location Update request to the optimum MSC/VLR 240b for the purpose of bypassing as much of the terrestrial network as possible. Alternatively, the Location Update request can be sent by the serving SBSS 220a to the optimum MSC/VLR 240b instead of being sent by the calling MS 20.

In many cases, the optimum MSC/VLR 240b is served by a different network operator (second network operator 275) than the network operator (first network operator 270) serving the MSC/VLR 240a of the calling MS 20. In order to prevent overconsumption of satellite resources associated with the second network operator 275 or optimum MSC/VLR 240b by mobile subscriber's associated with the first network operator 270, an optimization indication is included in the Location Update request sent by the MS 20 or the SBSS 220a to the optimum MSC/VLR 240b suggesting to the optimum MSC/VLR 240b that the reason for the Location Update request is the equivalent of "satellite radio access registration." In response to this optimization indication, the optimum MSC/VLR 240b determines the amount of available satellite radio resources and either accepts the Location Update request or returns a rejection message indicating that radio access registrations are either permanently or temporarily not allowed.

In preferred embodiments of the present invention, the optimum MSC/VLR 240b determines whether to accept or reject the Location Update request by checking preconfigured system settings 248 to see if the additional "satellite radio resource" re-registration would be detrimental to providing satellite radio resources to subscribers within the second network operator's area 275. This preconfigured setting 248 could take a number of forms, such as a threshold load 248 in which the optimum MSC/VLR 240b determines whether the current amount of utilized satellite resources for the second network operator 275 and/or the optimum MSC/VLR 240b has exceeded the threshold load 248. For example, if the second network operator 275 and/or the optimum MSC/VLR 240b has been allocated 25 percent of the available satellite resources and the threshold load 248 for the second network operator 275 and/or the optimum MSC/VLR 240b is 75 percent of the allocated satellite resources, if the load is currently at 80 percent of the allocated resources (80 percent of the allocated 25 percent of satellite resources are currently being used), the threshold load 248 has been exceeded, and the rejection message is sent. Otherwise, the Location Update request is accepted.

In further preferred embodiments of the present invention, a time period 249 indicating the amount of time that the MS 20 or SBSS 220a, depending upon which entity sent the Location Update request, must wait before sending another Location Update request can be included with the rejection message. The time period 249 can be one set period of time, or alternatively, different time periods 249 can be sent based upon the current satellite resource load. For example, a table with different threshold loads 248 representing different satellite load levels, in which each threshold load 248 has a different time period 249 associated therewith, can be included within a memory 247 within the optimum MSC/VLR 240b. If the current satellite load level has exceeded one of these threshold loads 248, the time period 249 associated with the highest exceeded threshold load 248 is returned to the MS 20 or SBSS 220a along with the rejection message. Typically, the higher the exceeded threshold load 248, e.g., the higher the load on the satellite resources, the longer the time period 249.

If the Location Update request is accepted, the MS 20 sends a SETUP message to the new optimum MSC/VLR 240b via the satellite 200 and the new optimum SBSS 220b, as is understood in the art. The call can then be completed normally using minimal terrestrial circuits and existing satellite resources. When the call is finished, the MS 20 is re-registered in the original serving MSC/VLR 240a. This re-registration is necessary for a number of commercial, regulatory and technical reasons.

However, if a rejection message is sent, the MS 20 or SBSS 220a sends a SETUP request to the original serving MSC/VLR 240a, which includes an indication that re-registration could not be performed to the optimum MSC/VLR 240b. In addition, if a time period 249 was included in the rejection message, the SETUP request can also include the received time period 249, along with the identity of the optimum MSC/VLR 240b. The original serving MSC/VLR 240a can then either setup the call to the called subscriber 260 within the PSTN 280 using a circuit connection 245 between the original MSC/VLR 240a and the optimum MSC/VLR 240b without optimizing the call or wait the predetermined time period 249 before instructing the MS 20 or the SBSS 20a to attempt to re-register with the optimum MSC/VLR 240b.

Figure 6:
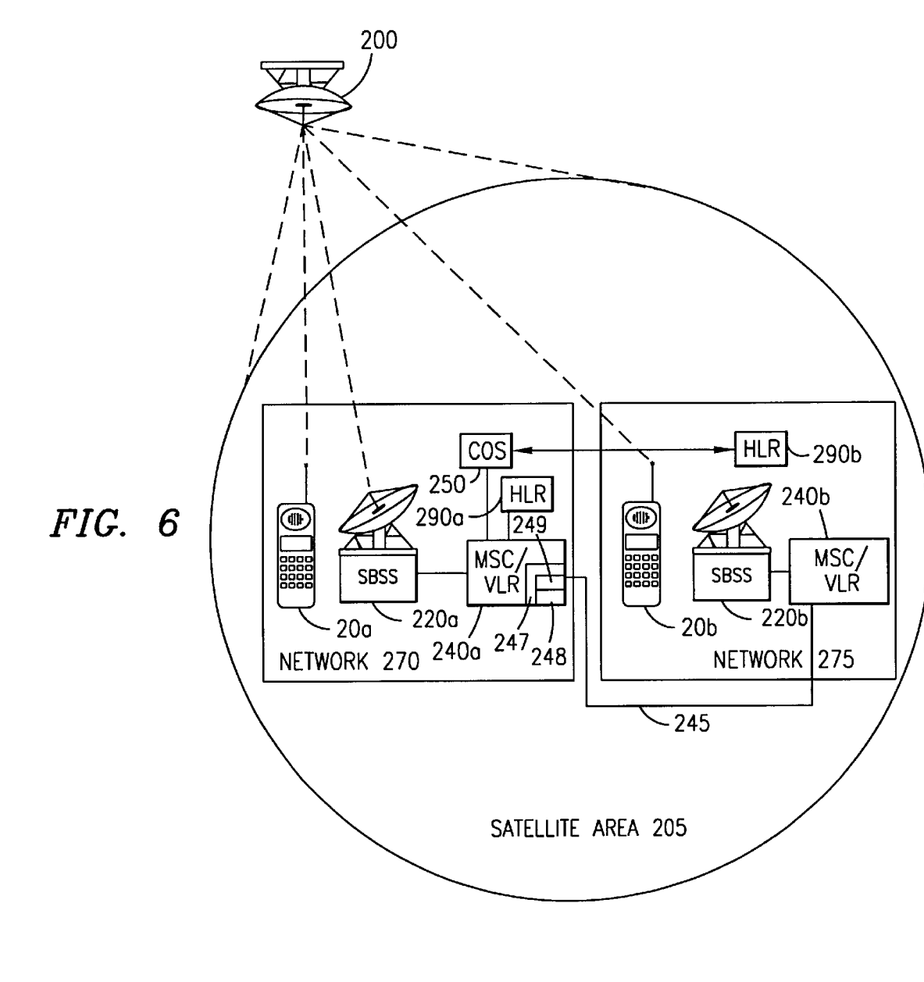
FIG. 6 illustrates the optimization of a mobile station to mobile station call based upon available satellite resources in accordance with embodiments of the present invention.

With reference now to FIG. 6 of the drawings, if the CPN is associated with another MS 20b belonging to a second network operator 275 within the area 205 visible to the satellite 200, after the SBSS 220a serving the area 270 that the calling MS 20a is in receives the Called Party Number (CPN) and sends it to the serving MSC/VLR 240a, which determines that the CPN is not a number registered within the serving MSC/VLR 240a, the digit string for the CPN is sent to the COS 250 for pre-analysis. The COS 250 determines that this is a MS 20a to MS 20b call and queries the HLR 290b serving the called MS 20b for the current location of the called (target) MS 20b. The COS 250 then assigns a transaction identifier to be used for making the connection between the two MSs (20a and 20b), and sends a USSD string to the target MS 20b via the MSC/VLR 240b serving the target MS 20b requesting the target MS 20b to re-register itself on the MSC/VLR 240a where the call originated. It should be understood that the COS 250 can be a separate node, co-located with the MSC/VLR 240a, co-located with the HLR 290a or located within an external node (not shown). The target MS 20b is also given the transaction identifier. In this way, satellite resources can be conserved by performing the connection for these calls within the satellite 200, e.g., only one bi-directional path is required (MS-satellite-MS) instead of two (MS-satellite-SBSS-satellite-MS).

In this situation, the target MS 20b sends the Location Update request and optimization indication to the original serving MSC/VLR 240a via the satellite 200 and the original serving SBSS 220a of the calling MS 20a. The original serving MSC/VLR 240a examines this optimization indication, and based on the amount of available satellite radio resources, e.g., the results of a comparison between the current amount of utilized satellite resources and a threshold load 248 stored in a memory 247 within the MSC/VLR 240a, either accepts the Location Update request or returns a rejection message and preferably a time period 249 indicating that radio access registrations are not allowed.

If the Location Update request is accepted, after re-registration by the called MS 20b in the original serving MSC/VLR 240a, normal call setup procedures take place, with the addition of an indicator that this is a MS 20a to MS 20b call and the inclusion of the transaction identifier. The MS 20a to MS 20b call indicator is used to disable functions requiring terrestrial switch connections. The transaction identifier is used when channel assignments are done and the connection is made to ensure that the right channels can be connected in the satellite 200. Once the connection is made in the satellite 200, the transaction identifier can be released.

However, if the rejection message is sent, the COS 250 and the original serving MSC/VLR 240a are notified of the rejection. Thereafter, the call can then be setup in a normal fashion (i.e. MS 20a—satellite 200—SBSS 220a—MSC/VLR 240a—MSC/VLR 240b—SBSS 220a—satellite 200—MS 20b) via a circuit connection 245 between the MSC/VLR 240a serving the calling MS 20a and the MSC/VLR 240b serving the called MS 20b using the original CPN. This will result in a drop-back from the COS 250 to the originating MSC/VLR 240a, which will again query the HLR 290b associated with the called MS 20b for routing instructions. However, since the MSC/VLR 240a was notified that optimization could not occur, the MSC/VLR 240a does not send a request to the COS 250 to determine the optimum MSC/VLR 240a for the call.

Alternatively, if a time period 249 was included with the rejection message, this time period 249 is also sent to the original serving MSC/VLR 240a. The original serving MSC/VLR 240a can then either wait the indicated time period 249 before attempting to optimize the call again or can setup the call without optimization. It should be noted that the original serving MSC/VLR 240a can place a limit on the number of optimization attempts in order to ensure fast and reliable delivery of the call.

Figure 7:
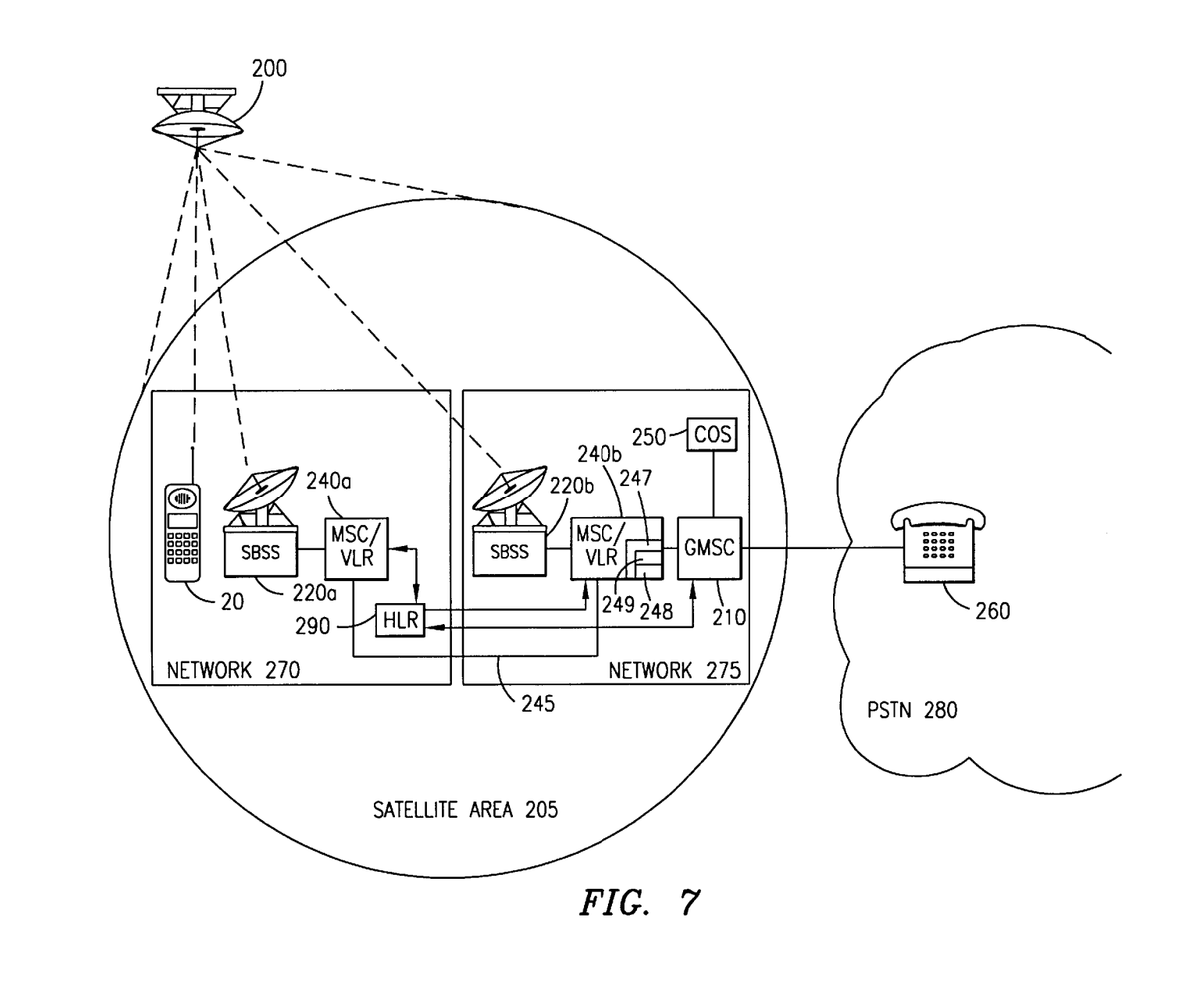
FIG. 7 illustrates the optimization of a call from a fixed subscriber to a mobile station based upon available satellite resources in accordance with embodiments of the present invention.

With reference now to FIG. 7 of the drawings, if a subscriber 260 within the PSTN 280 calls a MS 20, the PSTN 280 routes the call to the closest Gateway Mobile Switching Center (GMSC) 210, which serves as the interface between the PSTN 280 and the satellite network 205. The GMSC 210 then queries the HLR 290 associated with the called MS 20 to determine which MSC/VLR 240a the MS 20 is currently registered in. The HLR 290 forwards a request to that MSC/VLR 240a to provide a roaming number, e.g., a Mobile Subscriber Roaming Number (MSRN). The roaming number is returned to the GMSC 210 via the HLR 290 to be analyzed by the GMSC 210. If the roaming number is not a roaming number from the series assigned to the GMSCs 210 own co-located MSC/VLR 240b, call optimization can occur.

The GMSC 210 sends a request to the Call Optimization Server (COS) 250 to determine the optimum MSC/VLR 240b for the call. The COS 250 then sends a message to the MS 20 via the serving MSC/VLR 240a, the serving SBSS 220a and the satellite 200, ordering the MS 20 to re-register in the MSC/VLR 240b from where the COS 250 received the request. This message can take a number of underlying forms. Two examples for transport mechanisms for the message are Unstructured Supplementary Service Data (USSD), e.g., the message Unstructured_SS_Notify, or Short Message Service (SMS).

Due to the altitude of the satellite(s) 200, the MS 20 can see a satellite 200 which can communicate with both the MSC/VLR 240a where it is registered and the MSC/VLR 240b where it should be registered from an efficiency perspective. This means that the message can be routed to the MSC/VLR 240a where the subscriber is registered, using existing mechanisms for SMS message delivery. The MS 20 can then use the address of the optimum MSC/VLR 240b where it should re-register and perform the registration process to the new optimum MSC/VLR 240b, via the satellite 200 and the new optimum SBSS 220b, by sending the Location Update request and optimization indication to the optimum MSC/VLR 240b. The optimum MSC/VLR 240b either accepts or rejects the Location Update request based upon the amount of satellite radio resources in use. The time period 249 can also be included in the rejection message, as discussed hereinbefore.

If the Location Update request is accepted, the MS 20 then re-registers in the optimum MSC/VLR 240b and acknowledges the request to the COS 250. Alternatively, the optimum MSC/VLR 240b can notify the COS 250. The call can then be setup within the optimum MSC/VLR 240b using the original CPN, as discussed hereinbefore. Advantageously, if the COS 250 is a separate node, once the call is returned to the GMSC 210, all links between the COS 250 and the GMSC 210 are severed for the duration of the call, resulting in minimal usage of terrestrial links.

However, if a rejection message is sent to the called MS 20, the COS 250 and GMSC 210 are notified of the rejection. Thereafter, the call can then be setup as normal via the circuit connection 245 between the serving MSC/VLR 240a and the optimum MSC/VLR 240b using the original CPN. This will result in a drop-back from the COS 250 to the GMSC 210, which will again query the HLR 290 for routing instructions. However, since the GMSC 210 was notified that optimization could not occur, the GMSC 210 does not send a request to the COS 250 to determine the optimum MSC/VLR 240b for the call. Alternatively, if a time period 249 was included with the rejection message, this time period 249 is also sent to the GMSC 210. The GMSC 210 can then either wait the indicated time period 249 before attempting to optimize the call again or can setup the call without optimization. It should be noted that the GMSC 210 can place a limit on the number of optimization attempts in order to ensure fast and reliable delivery of the call.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the query to the Call Optimization Server to determine the optimum MSC/VLR can be sent by the serving SBSS instead of the serving MSC/VLR.

What is claimed is:

1. A telecommunications system for optimizing a call associated with a given one of a plurality of mobile stations, comprising:

an original one of a plurality of mobile switching centers having reception means for receiving a called number associated with said call;

an optimum one of said plurality of mobile switching centers for storing a predetermined parameter and an associated time period value therein, said optimum mobile switching center receiving a first registration message for said call, said first registration message including an optimization indication, determining a current amount of utilized satellite resources associated with said optimum mobile switching center in response to receipt of said optimization indication, comparing said predetermined parameter with said current amount of utilized satellite resources and transmitting a rejection message indicating that said mobile station is not allowed to register with said optimum mobile switching center for said call when said current amount of utilized satellite resources exceeds said predetermined parameter, said rejection message including said time period value, said time period value indicating the amount of time before a second registration message including said optimized indication for said call can be sent towards said optimum mobile switching center;

an optimization node, connected to said original mobile switching center, for receiving said called number from said original mobile switching center, and determining said optimum mobile switching center using said called number; and means for connecting said call through a selected one of said plurality of mobile switching centers based upon said current amount of utilized satellite resources associated with said optimum mobile switching center, said selected mobile switching center being in wireless communication with said given mobile station via a satellite.

2. The telecommunications system of claim 1, wherein said selected mobile switching center is said optimum mobile switching center when said current amount of utilized satellite resources does not exceed said predetermined parameter.

3. The telecommunications system of claim 1, wherein said call is placed from said given mobile station to a subscriber within the Public Switched Telephone Network, said original mobile switching center being in wireless communication with said given mobile station, said original mobile switching center and said optimum mobile switching center being located within an area covered by said satellite, said selected mobile switching center being said original mobile switching center when said current amount of utilized satellite resources exceeds said predetermined parameter.

4. The telecommunications system of claim 1, wherein said call is placed from a subscriber within the Public Switched Telephone Network to said given mobile station, said optimum mobile switching center being said original mobile switching center, said given mobile station being in wireless communication with a serving mobile switching center, said serving mobile switching center and said original mobile switching center being located within an area covered by said satellite, said selected mobile switching center being said serving mobile switching center when said current amount of utilized satellite resources exceeds said predetermined parameter.

5. The telecommunications system of claim 4 wherein said means for connecting further comprises:

means for connecting said call from said subscriber, to said mobile original mobile switching center, to said selected mobile switching center and to said given mobile station via said satellite.

6. The telecommunications system of claim 1, wherein said call is placed from a calling mobile station to said given mobile station, said optimum mobile switching center being said original mobile switching center, said given mobile station being in wireless communication with a serving mobile switching center, said serving mobile switching center and said original mobile switching center being located within an area covered by said satellite, said selected mobile switching center being said serving mobile switching center when said current amount of utilized satellite resources exceeds said predetermined parameter.

7. The telecommunications system of claim 6 wherein said means for transmitting comprises:

means for connecting said call from said calling mobile station, to said original mobile switching center, to said selected mobile switching center and to said given mobile station via said satellite.

8. The telecommunications system of claim 1, wherein said registration message including said optimization indication is transmitted by said mobile station, said rejection message being transmitted from said optimum mobile switching center to said mobile station.

9. The telecommunications system of claim 8, wherein said time period value relates to the amount of time said mobile station must wait before transmitting said second registration request including said optimization indication.

10. The telecommunications system of claim 1, further comprising:

means for sending an instruction message from said optimization node to said given mobile station instructing said given mobile station to register with said optimum mobile switching center via said original mobile switching center and said satellite.

11. The telecommunications system of claim 1, further comprising:

a satellite-adapted base station system connected to said original mobile switching center, said first registration message being sent from said satellite-adapted base station system to said optimum mobile switching center, said rejection message being sent from said optimum mobile switching center to said satellite-adapted base station system.

12. The telecommunications system of claim 11, further comprising:

means for transmitting said second registration request along with said optimization indication from said satellite-adapted base station system to said optimum mobile switching center when the time associated with said time period value has expired.

13. An optimum mobile switching center for selectively completing a call associated with a given one of a plurality of mobile stations based upon the amount of utilized satellite resources associated with said optimum mobile switching center, said optimum mobile switching center comprising:

means for receiving a registration message for said given mobile station including an optimization indication;

a predetermined parameter and associated time period value stored within a memory;

means for determining a current amount of utilized satellite resources associated with said optimum mobile switching center in response to receipt of said optimization indication;

means for comparing said predetermined parameter and said current amount of utilized satellite resources;

means for transmitting a rejection message indicating that said mobile station is not allowed to register with said optimum mobile switching center for said call when said current amount of utilized satellite resources exceeds said predetermined parameter, said rejection message including said time period value, said time period value indicating the amount of time before a second registration message including said optimized indication can be sent towards said optimum mobile switching center; and means for connecting said call via a satellite when said current amount of utilized satellite resources does not exceed said predetermined parameter.

14. The optimum mobile switching center of claim 13, wherein said rejection message is transmitted to said given mobile station.

15. The optimum mobile switching center of claim 14, wherein said time period value relates to the amount of time said mobile station must wait before transmitting said second registration request including said optimization indication.

16. A method for optimizing a call associated with a given one of a plurality of mobile stations based upon the amount of satellite resources in use, comprising the steps of:

receiving, by an original one of a plurality of mobile switching centers, a called number associated with said call;

determining an optimum one of said plurality of mobile switching centers using said called number;

storing, within said optimum mobile switching center, a predetermined parameter and an associated time period value;

transmitting a first registration message including an optimization indication to said optimum mobile switching center;

determining a current amount of utilized satellite resources associated with said optimum mobile switching center in response to receipt of said optimization indication;

comparing by said optimum mobile switching center, said current amount of utilized satellite resources with said predetermined parameter;

transmitting a rejection message, by said optimum mobile switching center, indicating that said mobile station is not allowed to register with said optimum mobile switching center for said call when said current amount of utilized satellite resources exceeds said predetermined parameter, said rejection message including said time period value, said time period value indicating the amount of time before a second registration message including said optimized indication for said call can be sent towards said optimum mobile switching center; and connecting said call through a selected one of said plurality of mobile switching centers based upon said current amount of utilized satellite resources, said selected mobile switching center being in wireless communication with said given mobile station via a satellite.

17. The method of claim 16, further comprises the step of:

sending said called number from said original mobile switching center to an optimization node connected to said original mobile switching center.

18. The method of claim 17, further comprising the step of:

sending an instruction message from said optimization node to said given mobile station instructing said given mobile station to register with said optimum mobile switching center via said original mobile switching center and said satellite.

19. The method of claim 16, wherein said step of connection further comprises the step of:

connecting said call through said optimum mobile switching center when said current amount of utilized satellite resources does not exceed said predetermined parameter, said selected mobile switching center being said optimum mobile switching center.

20. The method of claim 16, further comprising the step of:

placing said call from said given mobile station to a subscriber within the Public Switched Telephone Network, said original mobile switching center being in wireless communication with said given mobile station, said original mobile switching center and said optimum mobile switching center being located within an area covered by said satellite.

21. The method of claim 20, wherein said step of connecting further comprises the step of:

connecting said call through said original mobile switching center when said current amount of utilized satellite resources exceeds said predetermined parameter, said original mobile switching center being said selected mobile switching center.

22. The method of claim 16, further comprising the step of:

placing said call from a subscriber within the Public Switched Telephone Network to said given mobile station, said optimum mobile switching center being said original mobile switching center, said given mobile station being in wireless communication with a serving mobile switching center, said serving mobile switching center and said original mobile switching center being located within an area covered by said satellite.

23. The method of claim 22, wherein said step of connecting further comprises the step of:

connecting said call through said serving mobile switching center when said current amount of utilized satellite resources exceeds said predetermined parameter, said serving mobile switching center being said selected mobile switching center.

24. The method of claim 23, wherein said step of connecting further comprises the step of:

connecting said call from said subscriber, to said original mobile switching center, to said selected mobile switching center and to said given mobile station via said satellite.

25. The method of claim 16, further comprising the step of:

placing said call from a calling mobile station to said given mobile station, said optimum mobile switching center being said original mobile switching center, said given mobile station being in wireless communication with a serving mobile switching center, said serving mobile switching center and said original mobile switching center being located within an area covered by said satellite.

26. The method of claim 25, wherein said step of connecting further comprises the step of:

connecting said call through said serving mobile switching center when said current amount of utilized satellite resources exceeds said predetermined parameter, said serving mobile switching center being said selected mobile switching center.

27. The method of claim 26, wherein said step of connecting further comprises the step of:

connecting said call from said calling mobile station, to said original mobile switching center, to said selected mobile switching center and to said given mobile station via said satellite.

28. The method of claim 16, wherein said step of transmitting said first registration request further comprises the step of:

transmitting said first registration request including said optimization indication from said mobile station to said optimum mobile switching center; and wherein said step of transmitting said rejection message further comprises the step of:

transmitting said rejection message from said optimum mobile switching center to said mobile station.

29. The method of claim 28, further comprising the step of:

transmitting said second registration request including said optimization indication from said given mobile station to said optimum mobile switching center when the time associated with said time period value expires.

30. The method of claim 16, wherein said step of transmitting said first registration message further comprises the step of:

transmitting said first registration message from a satellite-adapted base station system connection to said original mobile switching center to said optimum mobile switching center; and wherein said step of transmitting said rejection message further comprises the step of:

transmitting said rejection message from said optimum mobile switching center to said satellite-adapted base station system.

31. The method of claim 30, further comprising the step of:

transmitting said second registration request along with said optimization indication from said satellite-adapted base station system to said optimum mobile switching center when the time associated with said time period value has expired.

\* \* \* \* \*